US012703088B2

(12) United States Patent
Baughman et al.

(10) Patent No.: US 12,703,088 B2
(45) Date of Patent: Aug. 11, 2026

(54) BATTERY PACK THERMAL AND GASEOUS STRESS MITIGATION

(71) Applicant: International Business Machines Corporation, Armonk, NY (US)

(72) Inventors: Aaron K. Baughman, Cary, NC (US); Sarbajit K. Rakshit, Kolkata (IN); Kavitha Hassan Yogaraj, Bangalore (IN); Mauro Marzorati, Lutz, FL (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 18/318,855

(22) Filed: May 17, 2023

(65) Prior Publication Data

US 2024/0383130 A1 Nov. 21, 2024

(51) Int. Cl.
*B25J 9/16* (2006.01)

(52) U.S. Cl.
CPC .................................... *B25J 9/163* (2013.01)

(58) Field of Classification Search
CPC .. B25J 9/163; H01M 10/4207; H01M 10/633; H01M 10/425; H01M 10/482; H01M 10/486; H01M 50/289
See application file for complete search history.

(56) References Cited

U.S. PATENT DOCUMENTS 10,673,260 B2 6/2020 Greening
10,942,080 B2 3/2021 Bailey
2021/0245627 A1* 8/2021 Ferguson ............. G05D 1/0291
2022/0231365 A1 7/2022 Lee
2022/0314837 A1 10/2022 Gupta

FOREIGN PATENT DOCUMENTS

EP 4210148 A1 7/2023
KR 10-2176097 B1 11/2020
TW 670895 B 9/2019
TW 202239634 A 10/2022
WO WO-2014047812 A1 * 4/2014 ............ H01M 50/40
WO 2023279096 A2 1/2023

OTHER PUBLICATIONS

International Searching Authority, “Notification of Transmittal of the International Search Report and the Written Opinion of the International Searching Authority, or Declaration,” Patent Cooperation Treaty, Sep. 5, 2024, 18 pages, International Application No. PCT/EP2024/060751.

(Continued)

*Primary Examiner* — Karie O’Neill Apicella
(74) *Attorney, Agent, or Firm* — Elliot J. Shine

(57) ABSTRACT

The present inventive concept provides for a method of battery pack thermal and gaseous stress mitigation. The method includes obtaining data related to batteries within a battery pack. Features are extracted from the obtained data related to the batteries. The extracted features include effected batteries, battery positions, gas and temperature measurements, and gas and temperature thresholds. The extracted features are mapped. Effected battery patterns are identified. Space is created between the effected batteries and adjacent batteries based on the identified effected battery patterns.

25 Claims, 4 Drawing Sheets

(56) References Cited

OTHER PUBLICATIONS

"Graph (discrete mathematics)", Wikipedia, downloaded from the Internet on May 10, 2023, 7 pages, <https://en.wikipedia.org/wiki/Graph_(discrete_mathematics)>.
"Wireless power transfer", Wikipedia, downloaded from the Internet on May 10, 2023, 22 pages, <https://en.wikipedia.org/wiki/Wireless_power_transfer>.
Agrawal et al., "Scheduling Parallelizable Jobs Online to Minimize the Maximum Flow Time", SPAA '16, Jul. 11-13, 2016, Pacific Grove, CA, USA, DOI: http://dx.doi.org/10.1145/2935764.2935782, 11 pages.
Badawy et al., "Power Flow Management of a Grid Tied PV-Battery Powered Fast Electric Vehicle Charging Station", Published in: 2015 IEEE Energy Conversion Congress and Exposition (ECCE), Conference Date: Sep. 20-24, 2014, DOI: 10.1109/ECCE.2015.7310359, Montreal, QC, Canada, 8 pages.
Dong et al., "Computation Offloading for Mobile-Edge Computing with Maximum Flow Minimum Cut", CSAE '18, Oct. 22-24, 2018, Hohhot, China, https://doi.org/10.1145/3207677.3277943, 5 pages.
Galushkin et al., "Mechanism of Gases Generation during Lithium-Ion Batteries Cycling", Journal of the Electrochemical Society, 166 (6) A897-A908 (2019), Published Mar. 15, 2019, DOI: 10.1149/2.0041906jes, 13 pages, <https://iopscience.iop.org/article/10.1149/2.0041906jes/pdf>.
Gunderson, David, "Keep an Eye on Temperature Trends During Li-ion Battery Charge and Discharge Cycles", ElectronicDesign, Jul. 28, 2009, 5 pages, <https://www.electronicdesign.com/technologies/boards/article/21749397/keep-an-eye-on-temperature-trends-during-Iiion-battery-charge-and-discharge-cycles>.
Heilweil, Rebecca, "How to build a better battery", Vox, Updated Apr. 18, 2022, 8 pages, <https://www.vox.com/recode/23027110/solid-state-lithium-battery-tesla-gm-ford>.
Karanja et al., "Optimal Battery Location for Minimizing the Total Cost of Generation in a Power System", 2020 IEEE PES/IAS PowerAfrica, Date of Conference: Aug. 25-28, 2020, DOI: 10.1109/PowerAfrica49420.2020.9219804, Nairobi, Kenya, 5 pages.
Kusakana, Kanzumba, "Daily operation cost minimization of photovoltaic-diesel-battery hybrid systems using different control strategies", IECON 2015—41st Annual Conference of the IEEE Industrial Electronics Society, Date of Conference: Nov. 9-12, 2015, DOI: 10.1109/IECON.2015.7392661, Yokohama, Japan, 5 pages.
Lopes, Miguel Venancio, "EV battery pack design", downloaded from the Internet on Mar. 17, 2023, 4 pages, <https://solutions.covestro.com/en/highlights/articles/stories/2021/plastic-parts-for-battery-pack-design>.
Torng et al., "SRPT optimally utilizes faster machines to minimize flow time", ACM Transactions on Algorithms, vol. 5, No. 1, Article 1, Publication date: Nov. 2008, http://doi.acm.org/10.1145/1435375.1435376, 25 pages.

* cited by examiner

FIG. 1

Figure 2:
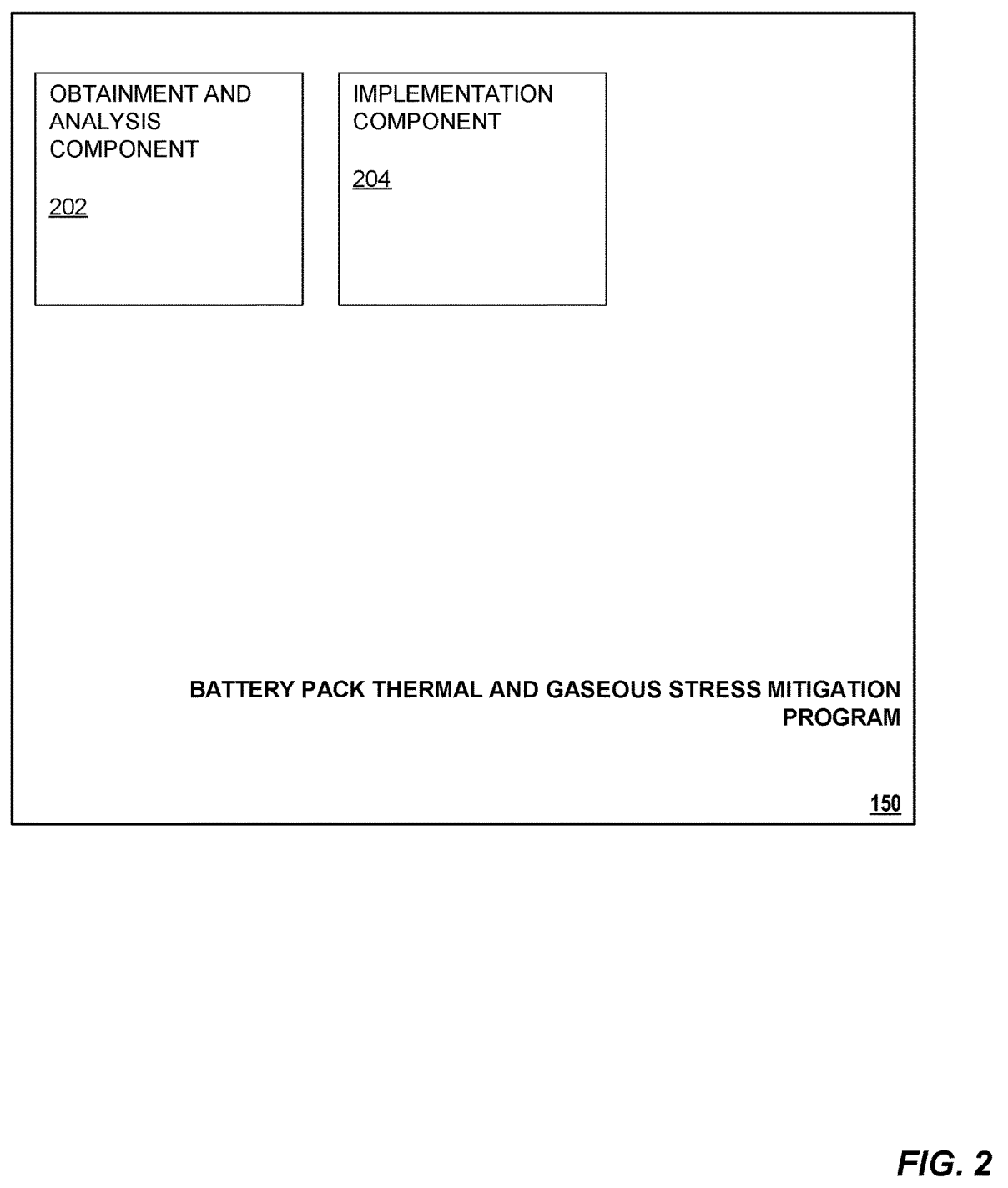

OBTAINMENT AND ANALYSIS COMPONENT

202

IMPLEMENTATION COMPONENT

204

BATTERY PACK THERMAL AND GASEOUS STRESS MITIGATION PROGRAM

BATTERY PACK THERMAL AND GASEOUS STRESS MITIGATION

BACKGROUND

Exemplary embodiments of the present inventive concept relate to battery pack thermal and gaseous stress, and more particularly, to battery pack thermal and gaseous stress mitigation.

A battery pack is a set of any number of typically identical batteries (e.g., lithium-ion batteries) or individual battery cells. They can be configured in a series, parallel, or a mixture of both to deliver the desired voltage, capacity, and/or power density. The term battery pack is often used in reference to cordless tools, radio-controlled hobby toys, and battery electric vehicles. Components of battery packs can include the individual batteries or cells and the interconnects which provide electrical conductivity between them. Rechargeable battery packs often contain a temperature sensor, which the battery charger uses to determine when charging is complete. Interconnects connect each cell, though batteries are most often arranged only in series strings. When a battery pack contains groups of cells in parallel, there are differing wiring configurations which take into consideration the electrical balance of the circuit. Battery regulators are sometimes used to keep the voltage of individual cells below their maximum thresholds when charging to allow weaker batteries to fully charge, thus bringing the whole battery pack back into balance. Active balancing can also be performed by battery balancer devices. Battery balancer devices can shuttle energy from strong cells to weaker ones in real-time. A well-balanced pack lasts longer and delivers better performance.

A lithium-ion battery graphite//NMC111 ($LiNi_{1/3}Mn_{1/3}Co_{1/3}O_2$) cell emits different gases during cycle in the voltage ranges of 2.6-4.2V and 2.6-4.8V and the temperatures of at 25° C. and 60° C. $CO_2$, CO, and $H_2$ gases are released because of electrolyte decomposition. CO and $H_2$ gas are directly released from the electrochemical reaction of electrolyte decomposition. Another potential independent source of $H_2$ gas evolution is from its absorption in pores of powdered graphite on an anode. $CO_2$ gas is produced from the additional chemical reaction of $O_2$ released from a cathode atomic lattice oxygen and CO released from the same place on the cathode (appearing because of the electrolyte decomposition). Thus, at the same electrochemical reaction of electrolyte decomposition, the ratio of $CO_2$/CO varies widely in the range of 0.82 to 2.42 depending on cycling conditions (temperature and cut-off voltage).

Lithium-ion chemistry cell packs are notoriously vulnerable to excessive temperature rises. Most lithium-ion cells should not be charged above 45° C. or discharged above 60° C. Although these temperature limits can be taken a bit higher, doing so compromises cycle life. Furthermore, if excess cell temperatures rise too much, venting may occur, and battery failure or even a cell fire can result. New lithium battery chemistries, like lithium iron phosphate ($LiFePO_4$), promise to raise both charge and discharge temperature limits, but they will be relatively low, nonetheless. The waste heat energy that causes excess temperature rise in lithium-ion chemistry batteries comes from several sources. During both charge and discharge, electronic circuit elements located around the battery may conduct heat into the cells. This is especially true for chargers since they are usually a switching power supply with a controller that implements the CC/CV algorithm required for the optimum charge of lithium-ion chemistry cells. A minimum of 10% of the energy passed through such a charger is lost as waste heat which can be transferred into the battery via terminals and other structures. In fact, some chargers can have conversion efficiencies as low as 70%.

While batteries in a battery pack are being used, they emit gas and generate heat. Generation of heat by one battery can be transmitted to an adjacent battery, and emitted gas can become trapped therebetween as the batteries are tightly packed in the battery pack. Thus, a means of mitigating thermal and gaseous stress is needed for effective and safe battery pack use, and to ensure that constituent battery lives are optimized.

SUMMARY

Exemplary embodiments of the present inventive concept relate to a method, a computer program product, and a system of battery pack thermal and gaseous stress mitigation.

According to an exemplary embodiment of the present inventive concept, a method of battery pack thermal and gaseous stress mitigation is provided. The method includes obtaining data related to batteries within a battery pack. Features are extracted from the obtained data related to the batteries. The extracted features include effected batteries, battery positions, gas and temperature measurements, and gas and temperature thresholds. The extracted features are mapped. Effected battery patterns are identified. Space is created between the effected batteries and adjacent batteries based on the identified effected battery patterns.

According to an exemplary embodiment of the present invention, a computer program product is for battery pack thermal and gaseous stress mitigation is provided. The computer program product includes one or more computer-readable storage media and program instructions stored on the one or more non-transitory computer-readable storage media capable of performing a method. The present inventive concept provides for a method of battery pack thermal and gaseous stress mitigation. The method includes obtaining data related to batteries within a battery pack. Features are extracted from the obtained data related to the batteries. The extracted features include effected batteries, battery positions, gas and temperature measurements, and gas and temperature thresholds. The extracted features are mapped. Effected battery patterns are identified. Space is created between the effected batteries and adjacent batteries based on the identified effected battery patterns.

According to an exemplary embodiment of the present invention, a computer system is provided for battery pack thermal and gaseous stress mitigation. The computer system includes one or more computer processors, one or more computer-readable storage media, and program instructions stored on the one or more of the computer-readable storage media for execution by at least one of the one or more processors capable of performing a method. The present inventive concept provides for a method of battery pack thermal and gaseous stress mitigation. The method includes obtaining data related to batteries within a battery pack. Features are extracted from the obtained data related to the batteries. The extracted features include effected batteries, battery positions, gas and temperature measurements, and gas and temperature thresholds. The extracted features are mapped. Effected battery patterns are identified. Space is created between the effected batteries and adjacent batteries based on the identified effected battery patterns.

According to an exemplary embodiment of the present inventive concept, the location, magnitude, duration, and direction of created space are based on a minimum movement cost necessary to achieve at least one of restoring gas and temperature thresholds of the effected battery and preventing adjacent batteries from exceeding gas and temperature thresholds.

According to an exemplary embodiment of the present inventive concept, the creating of the space includes using a robotic base to elongate at least one space between at least one effected battery and at least one adjacent battery.

According to an exemplary embodiment of the present inventive concept, the robotic base is connected to a plurality of expandable links. The at least one effected battery and the at least one adjacent battery are connected by an expandable link.

According to an embodiment of the present inventive concept, a method of battery pack thermal and gaseous stress mitigation is provided. The method includes altering at least one battery pack condition to provide the battery pack thermal and gaseous stress mitigation using a robotic base. The at least one battery pack condition altered includes created space between effected batteries and adjacent batteries before at least one of temperature thresholds and gas thresholds are exceeded based on a predictive battery condition model. The predictive battery condition model includes effected battery patterns, and the effected battery patterns include times, durations, frequencies, positions, and magnitudes of at least one of exceeded gas thresholds and exceeded temperature thresholds.

According to an exemplary embodiment of the present inventive concept, a method of battery pack thermal and gaseous stress mitigation is provided. The method includes creating space between effected batteries and adjacent batteries in a battery pack based on real-time temperature measurements and real-time gas measurements. The effected batteries are batteries that have or will imminently exceed at least one of a predetermined gas threshold and a predetermined temperature threshold. The location, magnitude, duration, and direction of the created space is based on a difference between at least one of the real-time temperature measurements and the real-time gas measurements and at least one of the predetermined gas threshold and the predetermined temperature threshold, respectively.

BRIEF DESCRIPTION OF THE DRAWINGS

The following detailed description, given by way of example and not intended to limit the exemplary embodiments solely thereto, will best be appreciated in conjunction with the accompanying drawings, in which:

FIG. 1 illustrates a schematic diagram of computing environment 100 including a battery pack thermal and gaseous stress mitigation program 150, in accordance with an exemplary embodiment of the present inventive concept.

FIG. 2 illustrates a block diagram of components included in the thermal and gaseous stress mitigation program 150, in accordance with an exemplary embodiment of the present invention.

Figure 3:
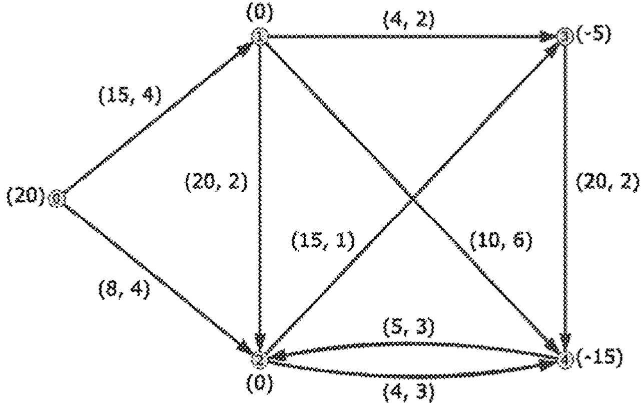
FIG. 3 depicts a minimum flow problem approach and space created by the gaseous and thermal stress mitigation program 150, in accordance with an exemplary embodiment of the present inventive concept.
Figure 3:
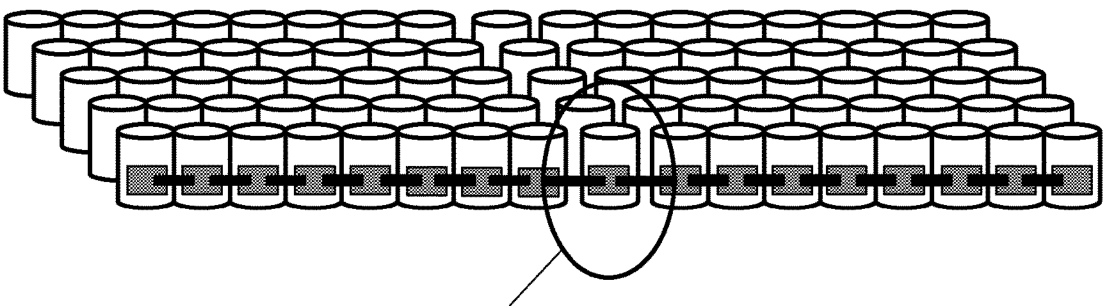

It is to be understood that the included drawings are not necessarily drawn to scale/proportion. The included drawings are merely schematic examples to assist in understanding of the present inventive concept and are not intended to portray fixed parameters. In the drawings, like numbering may represent like elements.

DETAILED DESCRIPTION

Exemplary embodiments of the present inventive concept are disclosed hereafter. However, it shall be understood that the scope of the present inventive concept is dictated by the claims. The disclosed exemplary embodiments are merely illustrative of the claimed system, method, and computer program product. The present inventive concept may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether explicitly described.

In the interest of not obscuring the presentation of the exemplary embodiments of the present inventive concept, in the following detailed description, some processing steps or operations that are known in the art may have been combined for presentation and for illustration purposes, and in some instances, may have not been described in detail. Additionally, some processing steps or operations that are known in the art may not be described at all. The following detailed description is focused on the distinctive features or elements of the present inventive concept according to various exemplary embodiments.

As mentioned above, batteries in a battery pack are tightly arranged. However, individual batteries, such as lithium-ion batteries, can generate heat and gas during use which can negatively affect adjacent batteries. Heat can be conducted to adjacent batteries and gas can get trapped between an effected battery and an adjacent battery, causing thermal and gaseous stress, respectively. Thermal and gaseous stress can decrease battery pack efficiency, longevity, and potentially create a safety hazard. The present inventive concept provides for a method, system, and computer program product for battery pack thermal and gaseous stress mitigation.

Figure 1:
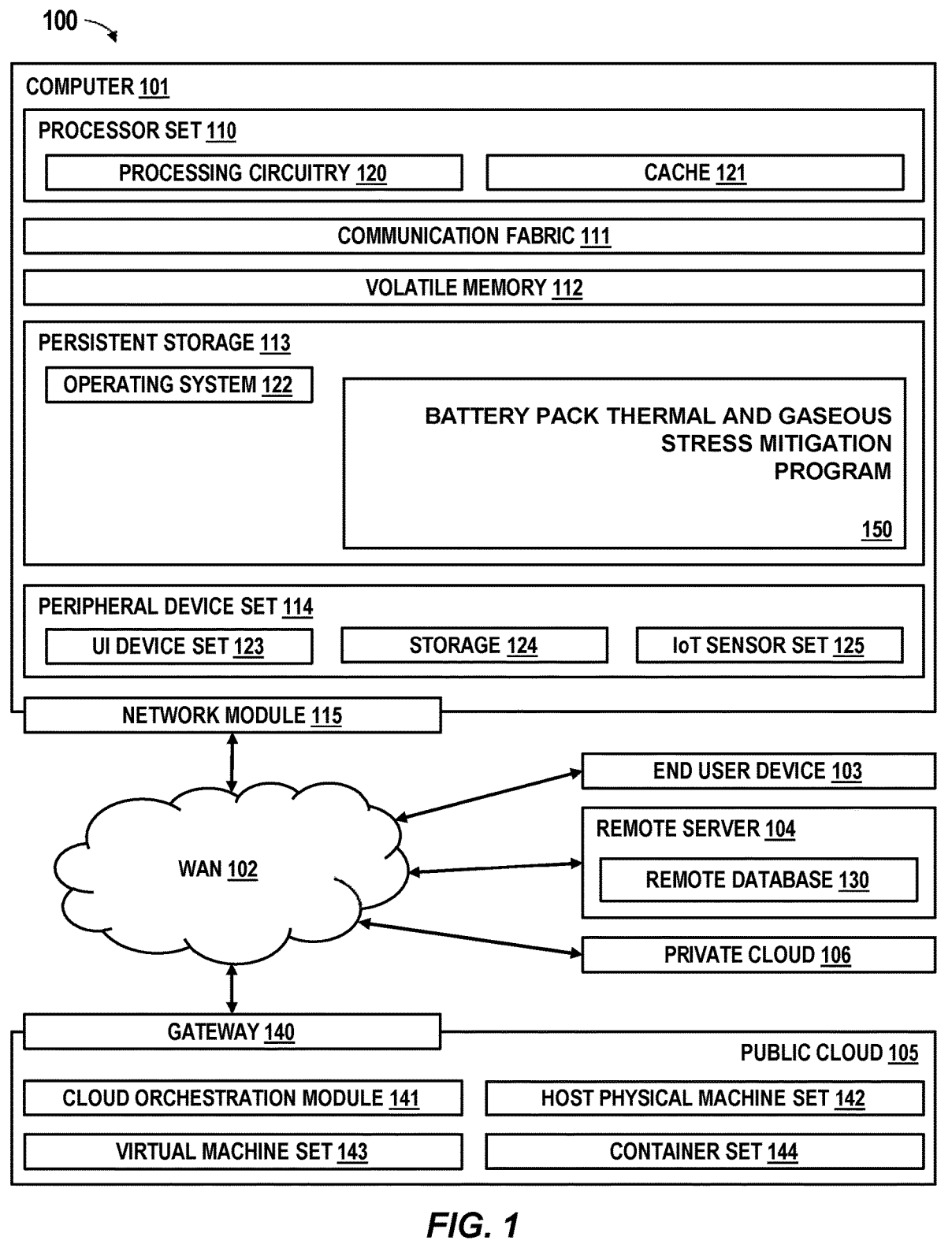

FIG. 1 illustrates a schematic diagram of computing environment 100 including the battery pack thermal and gaseous stress mitigation program 150, in accordance with an exemplary embodiment of the present inventive concept.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the battery pack thermal and gaseous stress mitigation program 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 illustrates a block diagram of components included in the battery pack thermal and gaseous stress mitigation program 150, in accordance with an exemplary embodiment of the present inventive concept.

An obtainment and analysis component 202 can obtain data related to batteries within a battery pack from sensors, manufacturer information, and/or use logs. The obtainment and analysis component can extract features from the manufacturer information and/or the logs related to the batteries within the battery pack, such as type (e.g., lithium-ion), manufacturer, machine of inclusion (e.g., electric vehicle, cordless tools, radio-controlled hobby cars, etc.), position (e.g., location in module, battery back, wiring configuration, etc.), capacity, performance characteristics (e.g., ideal charge/discharge), defect information (e.g., recalls, consumer complaints, error messages, etc.), voltage ranges/thresholds, temperature ranges/thresholds, average lifespan, health (e.g., efficiency of charge/discharge), age, total cycles, cycle frequency, historic temperature measurements and/or gas (e.g., CO, $CO_2$, $H_2$, etc.) measurements during use, etc. The obtained data related to the batteries within the battery pack can also include real-time gas and/or temperature measurements of at least one battery (e.g., individual batteries, battery clusters, wiring configurations, battery modules, battery pack regions, etc.) within a battery pack and/or adjacent spaces via the sensors. The obtainment and analysis component 202 can identify gas and/or temperature effected batteries (i.e., batteries that have or will imminently exceed gas and/or temperature thresholds). The obtainment and analysis component 202 can map the obtained data and extracted features thereof to identify effected battery patterns (e.g., vulnerable adjacent batteries, effected batteries, causes/predictions, extents/durations/ranges/frequencies/probabilities, and/or extenuating factors (e.g., external temperatures, battery age, confounding factors (e.g., malfunction elsewhere in machine of inclusion), etc.)). The obtainment and analysis component 202 can develop a predictive battery condition model. The obtainment and analysis component 202 can inform the user of effected batteries, vulnerable adjacent batteries, effected battery patterns, etc. by an annotated visual display.

For example, a user employs the battery pack thermal and gaseous stress mitigation program 150 to optimize and evaluate the battery pack of their several year-old electric vehicle (EV). The obtainment and analysis component 202 obtains the EV logs, battery pack logs, and EV/battery pack manufacturer information via the network as well as real-time gas and temperature measurements. The obtainment and analysis component 202 identifies specific gas and temperature effected batteries, vulnerable adjacent batteries, and extents/durations/ranges/frequencies/probabilities of impact for the user. The obtainment and analysis component 202 also creates a unique predictive battery condition model for the EV and generates an annotated visual display with a heat map for gas and temperature measurements.

The implementation component 204 can mitigate effected battery gas and/or thermal stress (predicted, imminent, or actual) by altering (e.g., diverting, increasing, decreasing, etc.) various conditions, such as battery space, battery use (e.g., charge or discharge), and/or battery airflow. A robotic base can implement the altered various conditions. The various conditions selected for alteration can be based on which singular or combined altered conditions mitigate effected gas and/or thermal stress most effectively (e.g., maximum efficacy, minimum mitigation, resource cost minimization, etc.). The implementation component 204 can calculate an optimal diverted battery use within the battery pack. The optimal diverted battery use can include redistribution of batteries, voltage, temperature and/or gas to non-effected batteries (e.g., individual batteries, battery clusters, battery wiring configurations, battery modules below their predetermined gas and/or temperature thresholds, etc.) for which redistribution will not induce effected batteries and/or will reduce the net amount of gas and/or temperature locations and/or magnitudes exceeded in the battery pack. The implementation component 204 can suction off gas in the vicinity of batteries, increase a battery pack airflow inlet/outlet aperture, and/or increase airflow (e.g., pump air, create space among batteries for air to flow to battery pack free-space or edges, etc.). A thermal conductive element (e.g., a heat pipe) can be positioned to prefer transfer to the left of the target battery for one iteration, and the right (or top/bottom/front/back) at the next iteration. The heat pipe can be connected to the robotic base and can be movable.

The implementation component 204 can be connected to a robotic base that can create directional (unidimensional or multidimensional) space between effected batteries and adjacent batteries (e.g., non-effected batteries or other effected batteries) by, for example, elongating space relative to adjacent batteries. The location, magnitude, duration, and direction of created space can be based on a minimum cost (e.g., resource, degree of use interference, movement, etc.) necessary to achieve at least one of restoring gas and temperature thresholds of at least one effected battery and preventing at least one adjacent battery from exceeding gas and/or temperature thresholds. The location, magnitude, duration, and direction of created space can also be based on predicted effect of altered airflow, predicted effect of diverted battery use, effect of heat diversion, gas and/or temperature measurements of effected and adjacent batteries, etc. In an exemplary embodiment of the present inventive concept, the spacing created might not be isomorphic or homogeneous, but can be biased in one or another direction, such that over successive iterations of the solution dispersion is on average homogeneous. This can be accomplished through the programmatic insertion of heatsinks of different performance characteristics, by shape (such as heat pipes) or material composition (such as composite sandwiching of conductive and isolating materials). The implementation component 204 can obtain feedback on the efficacy of space created and tune the predictive battery condition model accordingly. The annotated visual display can be updated to depict potential and/or actual altered conditions.

In an embodiment of the present inventive concept, a minimum flow problem can be used to encode the battery pack into a graphical lattice where each arc in the graph has a unit cost for transporting heat and gas across it. The arcs closer to the sides can have lower cost of matter transport. The goal is to find the flow with the least total cost. The length of the arcs can change based on expanding joints from the robotic base. Each battery node can represent both a supply node (a positive amount of heat and chemical discharge is added to the flow increasing the cost) and a demand node (a negative amount of heat and chemical is taken away from the flow based on diffusion). The implementation component 204 can setup the problem to minimize cost while maximizing the flow of heat and gas. The numbers in parenthesis can be extended to be any number of dimensions such as heat, $CO_2$, CO, and $H_2$. When this happens, the minimum flow problem becomes a multi-objective problem.

Included below is python code to implement the algorithm, according to an exemplary embodiment of the present inventive concept:

```
import numpy as np
from ortools.graph.python import min__cost__flow
smcf = min__cost__flow.SimpleMinCostFlow( )
start__nodes = np.array([0, 0, 1, 1, 1, 2, 2, 3, 4])
end__nodes = np.array([1, 2, 2, 3, 4, 3, 4, 4, 2])
capacities = np.array([15, 8, 20, 4, 10, 15, 4, 20, 5])
unit__costs = np.array([4, 4, 2, 2, 6, 1, 3, 2, 3])
supplies = [20, 0, 0, −5, −15]
all__arcs = smcf.add__arcs__with__capacity__and__unit__cost(
start__nodes, end__nodes, capacities, unit__costs)
smcf.set__nodes__supply(np.arange(0, len(supplies)), supplies)
status = smcf.solve( )
if status != smcf.OPTIMAL:
print('There was an issue with the min cost flow input.')
print(f'Status: {status}')
exit(1)
print(f'Minimum cost: {smcf.optimal__cost( )}')
print('')
print(' Arc Flow / Capacity Cost')
solution__flows = smcf.flows(all__arcs)
costs = solution__flows * unit__costs
for arc, flow, cost in zip(all__arcs, solution__flows, costs):
print(
f'{smcf.tail(arc):1} -> {smcf.head(arc)} {flow:3} /
{smcf.capacity(arc):3} {cost}'
```

For example, with reference to FIG. 3, nodes 1 and 3 represent the EV battery. Node 1 is a supply and node 3 is demand. A second battery is represented by node 2, a supply, and node 4, a demand node. Node 20 represents the charging terminal for the battery that creates its own heat and chemical gas. The numbers in parenthesis are either supply, such as positive integers or demand such as negative numbers. During charging, the supply node 0 generates 20 supply in both heat and gas. On the edges are capacity and cost. The capacity is what the space or temperature reading allows while the cost represents the growth potential of space between batteries. The lower the number the more growth potential. The implementation component 204 can determine the optimal effected battery movement, and accordingly elongates the space between the effected battery and the adjacent vulnerable batteries. Thus, gas is dissipated, and thermal conduction is reduced to vulnerable adjacent batteries.

Figure 4:
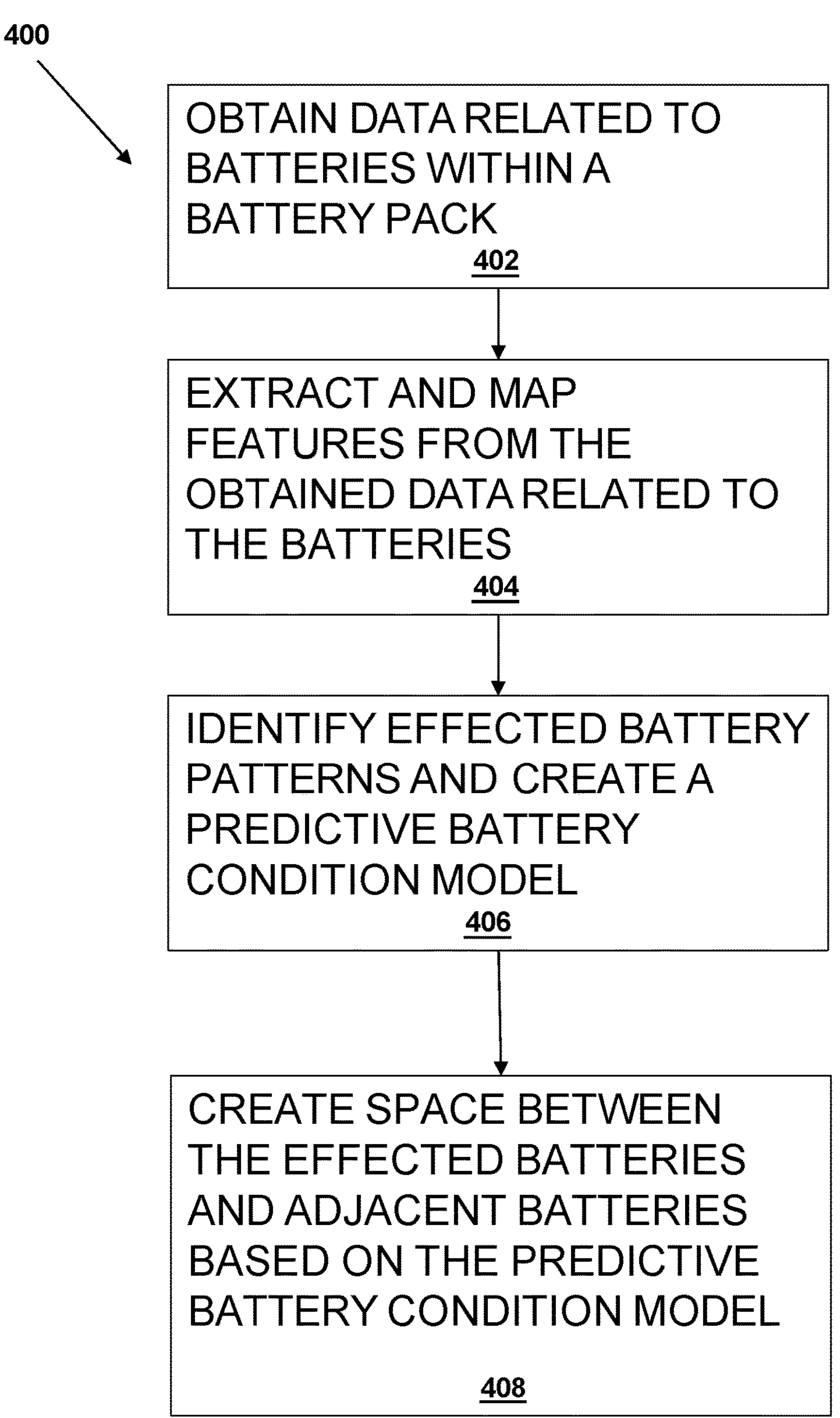
FIG. 4 illustrates a flowchart of a method of battery pack thermal and gaseous stress mitigation 400, in accordance with an exemplary embodiment of the present inventive concept.

FIG. 4 illustrates a flowchart of battery pack thermal and gaseous stress mitigation 400, in accordance with an exemplary embodiment of the present inventive concept.

The obtainment and analysis component 202 can obtain data related to batteries within a battery pack (step 402).

The obtainment and analysis component 202 can extract and maps features from the obtained data related to the batteries, wherein the extracted features include effected batteries, battery positions, gas and temperature measurements, and gas and temperature thresholds (step 404).

The obtainment and analysis component 202 can identify effected battery patterns and creates a predictive battery condition model (step 406).

The implementation component 204 can create space between the effected batteries and adjacent batteries based on the predictive battery condition model (step 408).

Based on the foregoing, a computer system, method, and computer program product have been disclosed. However, numerous modifications, additions, and substitutions can be made without deviating from the scope of the exemplary embodiments of the present inventive concept. Therefore, the exemplary embodiments of the present inventive concept have been disclosed by way of example and not by limitation.

What is claimed is:

1. A method of battery pack thermal and gaseous stress mitigation, the method comprising:

obtaining data related to batteries within a battery pack;

extracting features from the obtained data related to the batteries, wherein the extracted features include effected batteries, battery positions, gas and temperature measurements, and gas and temperature thresholds;

mapping the extracted features;

identifying effected battery patterns;

generating a predictive battery condition model based on the effected battery patterns;

creating space between the effected batteries and adjacent batteries using a robotic base, wherein the robotic base is utilized to elongate at least one space between at least one effected battery and at least one adjacent battery based on an output of the predictive battery condition model using the identified effected battery patterns; and tuning the predictive battery condition model based on an efficacy of the created space in mitigating or preventing battery pack thermal and gaseous stress.

2. The method of claim 1, wherein the location, magnitude, duration, and direction of created space are based on a minimum movement cost necessary to achieve at least one of restoring gas and temperature thresholds of the effected battery and preventing adjacent batteries from exceeding gas and temperature thresholds.

3. The method of claim 1, wherein the robotic base is connected to a plurality of expandable links, wherein the at least one effected battery and the at least one adjacent battery are connected by an expandable link.

4. The method of claim 1, wherein the robotic base grips the at least one effected battery in a stationary position and moves the at least one adjacent battery apart in a unidimensional direction.

5. The method of claim 1, wherein the effected battery patterns include specific effected batteries and at least one of corresponding positions, causes, predictions, extents, durations, ranges, frequencies, and probabilities.

6. The method of claim 1, wherein the creating the space, further comprises:

inserting a plurality of heatsinks of different performance characteristics including shape and material composition such that the space created is not isomorphic or homogenous; and annotating a visual display, wherein the visual display is annotated to depict potential and actual altered conditions corresponding to the plurality of heatsinks inserted and the efficacy of the space created.

7. A computer program product for battery pack thermal and gaseous stress mitigation comprising:

one or more computer-readable storage media and program instructions stored on the one or more non-transitory computer-readable storage media capable of performing a method, the method comprising:

obtaining data related to batteries within a battery pack;

extracting features from the obtained data related to the batteries, wherein the extracted features include effected batteries, battery positions, gas and temperature measurements, and gas and temperature thresholds;

mapping the extracted features;

identifying effected battery patterns;

generating a predictive battery condition model based on the effected battery patterns;

creating space between the effected batteries and adjacent batteries using a robotic base, wherein the robotic base is utilized to elongate at least one space between at least one effected battery and at least one adjacent battery based on an output of the predictive battery condition model using the identified effected battery patterns; and tuning the predictive battery condition model based on an efficacy of the created space in mitigating or preventing battery pack thermal and gaseous stress.

8. The computer program product of claim 7, wherein the location, magnitude, duration, and direction of created space are based on a minimum movement cost necessary to achieve at least one of restoring gas and temperature thresholds of the effected battery and preventing adjacent batteries from exceeding gas and temperature thresholds.

9. The computer program product of claim 7, wherein the robotic base is connected to a plurality of expandable links, wherein the at least one effected battery and the at least one adjacent battery are connected by an expandable link.

10. The computer program product of claim 7, wherein the robotic base grips the at least one effected battery in a stationary position and moves the at least one adjacent battery apart in a unidimensional direction.

11. The computer program product of claim 7, wherein the effected battery patterns include specific effected batteries and at least one of corresponding positions, causes, predictions, extents, durations, ranges, frequencies, and probabilities.

12. The computer program product of claim 7, wherein the creating the space, further comprises:

inserting a plurality of heatsinks of different performance characteristics including shape and material composition such that the space created is not isomorphic or homogenous; and annotating a visual display, wherein the visual display is annotated to depict potential and actual altered conditions corresponding to the plurality of heatsinks inserted and the efficacy of the space created.

13. A computer system for battery pack thermal and gaseous stress mitigation, the computer system comprising:

one or more computer processors, one or more computer-readable storage media, and program instructions stored on the one or more of the computer-readable storage media for execution by at least one of the one or more processors capable of performing a method, the method comprising:

obtaining data related to batteries within a battery pack;

extracting features from the obtained data related to the batteries, wherein the extracted features include effected batteries, battery positions, gas and temperature measurements, and gas and temperature thresholds;

mapping the extracted features;

identifying effected battery patterns;

generating a predictive battery condition model based on the effected battery patterns;

creating space between the effected batteries and adjacent batteries using a robotic base, wherein the robotic base is utilized to elongate at least one space between at least one effected battery and at least one adjacent battery based on an output of the predictive battery condition model using the identified effected battery patterns; and tuning the predictive battery condition model based on an efficacy of the created space in mitigating or preventing battery pack thermal and gaseous stress.

14. The computer system of claim 13, wherein the location, magnitude, duration, and direction of created space are based on a minimum movement cost necessary to achieve at least one of restoring gas and temperature thresholds of the effected battery and preventing adjacent batteries from exceeding gas and temperature thresholds.

15. The computer system of claim 13, wherein the robotic base is connected to a plurality of expandable links, wherein the at least one effected battery and the at least one adjacent battery are connected by an expandable link.

16. The computer system of claim 13, wherein the robotic base grips the at least one effected battery in a stationary position and moves the at least one adjacent battery apart in a unidimensional direction.

17. The computer system of claim 13, wherein the effected battery patterns include specific effected batteries and at least one of corresponding positions, causes, predictions, extents, durations, ranges, frequencies, and probabilities.

18. A method of battery pack thermal and gaseous stress mitigation, the method comprising:

altering at least one battery pack condition to provide the battery pack thermal and gaseous stress mitigation using a robotic base, wherein the at least one battery pack condition altered includes created space between effected batteries and adjacent batteries before at least one of temperature thresholds and gas thresholds are exceeded based on a predictive battery condition model, wherein the predictive battery condition model includes effected battery patterns, and wherein the effected battery patterns include times, durations, frequencies, positions, and magnitudes of at least one of exceeded gas thresholds and exceeded temperature thresholds.

19. The method of claim 18, wherein the battery pack conditions altered further include at least one of airflow, voltage, and temperature distribution, and wherein a plurality of battery pack conditions are altered in combination based on cost minimization.

20. A method of battery pack thermal and gaseous stress mitigation, the method comprising:

generating a predictive battery condition model based on effected battery patterns;

creating space between effected batteries and adjacent batteries in a battery pack based on real-time temperature measurements and real-time gas measurements, wherein the effected batteries are batteries that have or will imminently exceed at least one of a predetermined gas threshold and a predetermined temperature threshold, and wherein the location, magnitude, duration, and direction of the created space is based on a difference between at least one of the real-time temperature measurements and the real-time gas measurements and at least one of the predetermined gas threshold and the predetermined temperature threshold, respectively; and tuning the predictive battery condition model based on an efficacy of the created space in mitigating or preventing battery pack thermal and gaseous stress.

21. The computer system of claim 13, wherein the creating the space, further comprises:

inserting a plurality of heatsinks of different performance characteristics including shape and material composition such that the space created is not isomorphic or homogenous; and annotating a visual display, wherein the visual display is annotated to depict potential and actual altered conditions corresponding to the plurality of heatsinks inserted and the efficacy of the space created.

22. The method of claim 1, further comprising:

altering, using the robotic base, battery use within the battery pack based on a determination of an optimal diverted battery use, wherein the optimal diverted battery use includes a redistribution of batteries, voltage, temperature, and gas to non-effected batteries.

23. The method of claim 22, further comprising:

determining a positioning of a thermal conductive element connected to the robotic base, wherein the thermal conductive element is positioned relative to the at least one effected battery to increase airflow.

24. The method of claim 1, wherein a minimum flow problem is utilized to encode the battery pack into a graphical lattice, wherein each arc in a graph is associated with a unit cost for transporting heat and gas.

25. The method of claim 24, further comprising:

identifying a flow with a lowest associated cost, wherein a length of each arc changes according to expanding joints from the robotic base, and wherein each battery node represents both a supply node and a demand node.

* * * * *